US005723991A

United States Patent [19]
Runaldue et al.

[11] Patent Number: 5,723,991
[45] Date of Patent: Mar. 3, 1998

[54] SYSTEM AND METHOD FOR WAVEFORM SYNTHESIS

[75] Inventors: Thomas Jefferson Runaldue; Yi Cheng, both of San Jose, Calif.

[73] Assignee: Advanced Micro Devices, Inc., Sunnyvale, Calif.

[21] Appl. No.: 599,188

[22] Filed: Feb. 9, 1996

[51] Int. Cl.⁶ .................. G06F 1/02; H03K 3/02
[52] U.S. Cl. .............. 327/105; 327/106; 327/107; 364/721; 364/718
[58] Field of Search .................. 364/721, 718; 327/100, 105, 106, 107, 124, 129; 375/60, 106

[56] References Cited

U.S. PATENT DOCUMENTS

| | | | |
|---|---|---|---|
| 3,838,414 | 9/1974 | Wiles | 340/347 |
| 4,179,672 | 12/1979 | Voles | 332/16 |
| 4,516,087 | 5/1985 | Bruene | 332/17 |
| 4,897,620 | 1/1990 | Paradise | 332/100 |
| 5,187,677 | 2/1993 | Kovalick | 364/721 |
| 5,258,937 | 11/1993 | Blackmon | 364/718 |
| 5,267,269 | 11/1993 | Shih et al. | 375/60 |

FOREIGN PATENT DOCUMENTS

| | | | |
|---|---|---|---|
| 0 082 335 A2 | 6/1983 | European Pat. Off. | G06F 7/62 |
| 1552-344 | 3/1990 | U.S.S.R. | |

*Primary Examiner*—Terry Cunningham
*Assistant Examiner*—Dinh T. Le
*Attorney, Agent, or Firm*—Fliesler Dubb Meyer & Lovejoy

[57] ABSTRACT

A system for synthesizing a waveform includes waveform synthesis circuitry that generates digital data for each of a set of waveform pulses having preselected slopes at zero-crossing. A sequencer tracks the history of information contained in a data signal and selects a sequence of the waveform pulses in response to the history such that the sequence conveys the history of information while minimizing mismatches between the slopes of adjacent waveform pulses in the sequence.

14 Claims, 11 Drawing Sheets

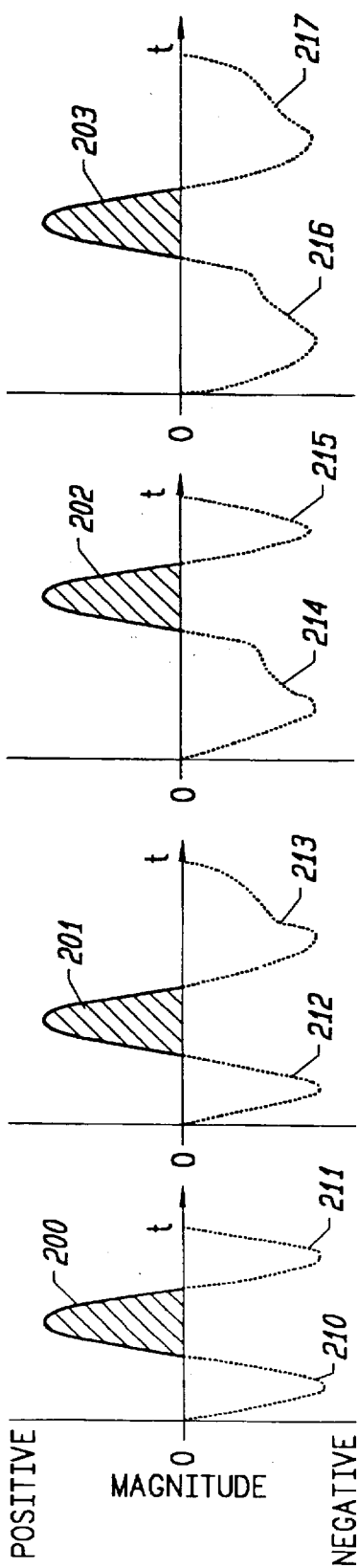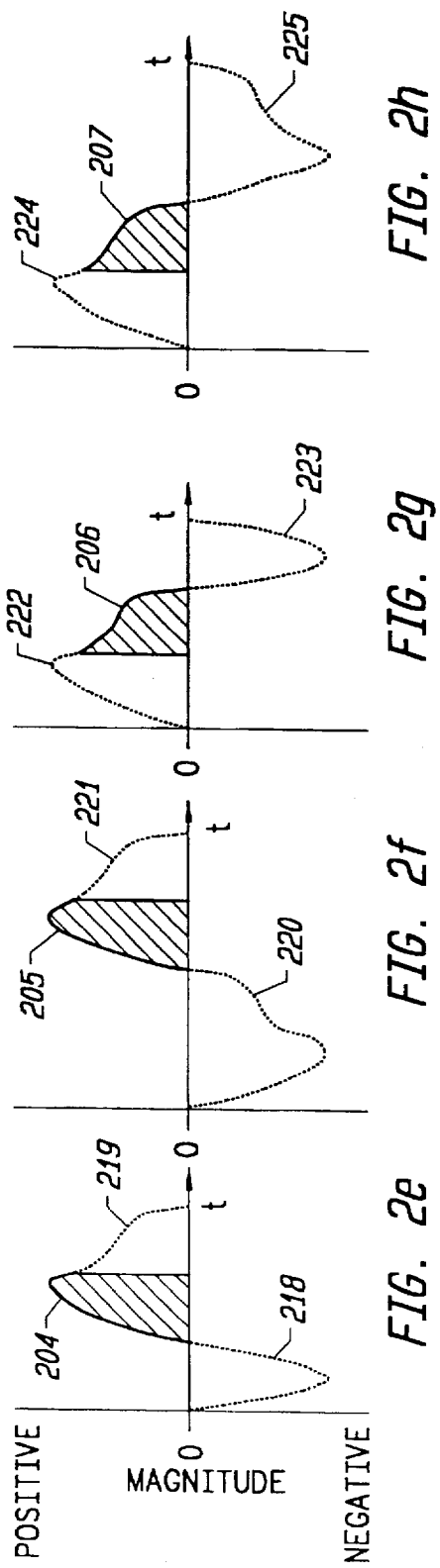

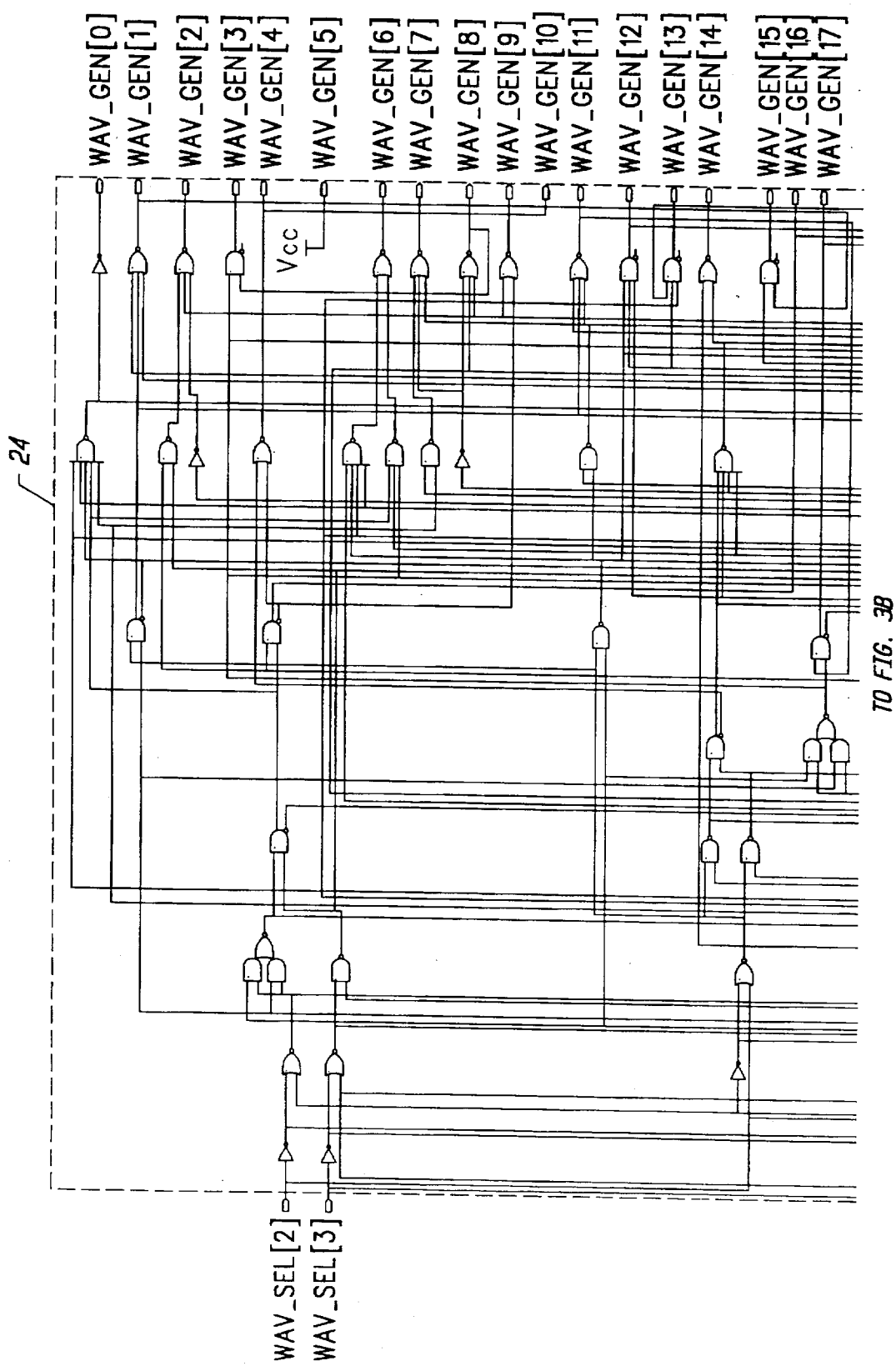

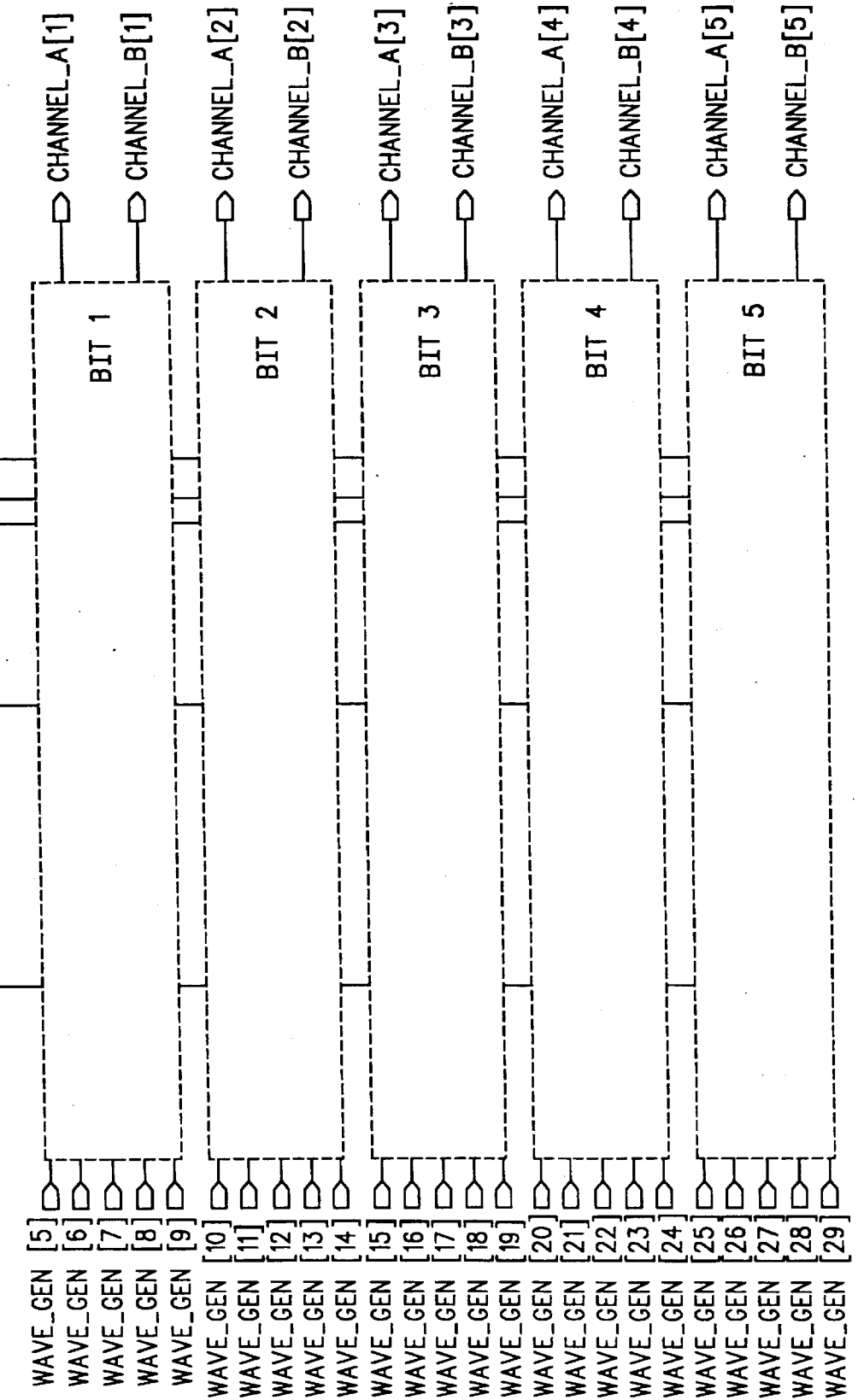

SYSTEM AND METHOD FOR WAVEFORM SYNTHESIS

BACKGROUND OF THE INVENTION

1. Field of Invention

The present invention pertains to the field of electronic systems. More particularly, this invention relates to a system and method for imparting an analog waveform onto a transmission line.

2. Art Background

Electronic systems including communication systems that drive electronic transmission lines are typically subject to a variety of government regulations. Such regulations usually include regulations that restrict the excessive production of electromagnetic fields. For example, the Federal Communications Counsel (FCC) in the United States of America commonly imposes limits on the amount of electromagnetic interference (EMI) generated by an electronic system. Such a restriction on EMI levels is intended to limit stray EMI radiation from electronic equipment to an acceptable level and prevent interference with various communication systems.

Electronic systems that provide high-speed data communication commonly employ unshielded transmission lines. Such unshielded transmission lines include, for example, twisted pair transmission lines that are commonly employed in local area networks such as Ethernet networks. Typically, such an unshielded transmission line behaves like an antenna while carrying high-speed data communication signals. Such antenna-like behavior of a transmission line can generate undesirable levels of EMI radiation.

In addition, prior electronic systems may employ a wave shaping technique that involves the synthesis of sinusoidal waveform pulses of differing frequencies. Typically, such electronic systems include digital to analog conversion circuits that generate the waveform pulses in response to digital samples of waveform data.

Such pulses of differing frequencies typically have differing slopes at the zero-crossing levels of the final synthesized waveform sequence. Unfortunately, such differing slopes typically create discontinuities in the digital data provided to the digital to analog conversion circuitry. Such discontinuities usually cause the generation of undesired high frequency harmonics. Such high frequency harmonics typically cause the production of excessively high levels of EMI radiation on an unshielded transmission line.

Some prior electronic systems limit such excessive EMI radiation from unshielded transmission lines by employing a passive low pass filter at the input to the transmission line. Such a low pass filter usually eliminates high frequency components in a data communication signal prior to injection into the transmission line, thereby inhibiting the production of high frequency EMI radiation. Unfortunately, such low pass filters typically include discrete capacitor elements which take up space and increase the overall cost of such electronic systems.

SUMMARY AND OBJECTS OF THE INVENTION

One object of the present invention is to provide an integrated circuit that imparts a waveform onto a transmission line while limiting undesirable high frequency components.

Another object of the present invention is to impart a waveform onto a transmission line by arranging adjacent waveform pulses in a manner that minimizes discontinuities at zero-crossings.

These and other objects are provided by a system for synthesizing a waveform including waveform synthesis circuitry that generates digital data for each of a set of waveform pulses. The waveform pulses have preselected slopes at zero-crossing levels. A sequencer tracks the history of information contained in an input data signal and selects a sequence of the waveform pulses in response to the history such that the sequence conveys the history of information while minimizing mismatches between the slopes of adjacent waveform pulses in the sequence. The system include digital to analog conversion circuitry that converts the digital data for the sequence of the selected waveform pulses into the waveform.

Other objects, features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIGS. 2a–2h illustrate the waveform pulses synthesized in the transmission system in an embodiment wherein the transmit_data signal is encoded as Manchester data;

DETAILED DESCRIPTION

Figure 1:
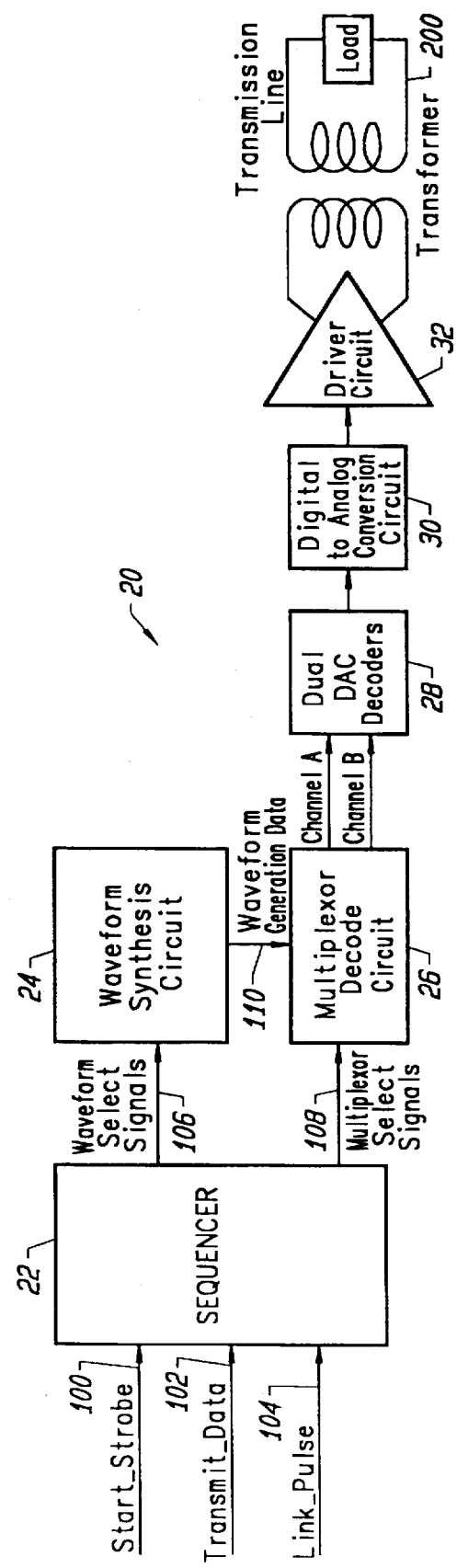
FIG. 1 illustrates a transmission system that imparts a synthesized analog waveform onto a transmission line.

FIG. 1 illustrates a transmission system 20 that performs waveform synthesis. The transmission system 20 receives a transmit_data signal 102 from a data communication source (not shown) and imparts a synthesized analog waveform onto a transmission line 200. The transmission system 20 includes circuitry that maintains a history of information changes in the transmit_data signal 102 and that synthesizes a sequence of pulses having differing slopes near zero-crossing portions of the synthesized analog waveform. The sequence of pulses convey the information contained in the transmit_data signal 102.

The transmission system 20 includes a sequencer 22, a waveform synthesis circuit 24 and a multiplexor decode circuit 26. The transmission system 20 also includes a digital to analog conversion (DAC) circuit 30 along with dual DAC decoders 28 and a driver circuit 32. The driver circuit 32 drives synthesized analog waveform onto the transmission line 200 through a 1:1 transformer.

In one embodiment, the sequencer 22, the waveform synthesis circuit 24, the multiplexor decode circuit 26, the dual DAC decoders 28, the digital to analog conversion circuit 30, and the driver circuit 32 are all contained on the same integrated circuit chip package. Such a highly integrated chip package with the on-chip wave shaping techniques described herein obviates the need for external discrete low pass filter components.

The sequencer 22 receives a start_strobe signal 100 along with the transmit_data signal 102. The transmit_data signal 102 carries encoded data communication information for transfer over the transmission line 200. The start_strobe signal 100 indicates the start of valid data communication packets in the transmit_data signal 102. A link pulse signal 104 controls the periodic transmission of a carrier detect signal over the transmission line 200.

In one embodiment, the transmission line 200 accommodates data communication according to the 10BASE-T Ethernet communication line standard. The link_pulse signal 104 provides a periodic pulse for transmission over the transmission line 200 in accordance with the 10BASE-T standard protocol.

The sequencer 22 selects a sequence of predetermined waveform pulses according to the history of frequency changes in the transmit_data signal 102. The sequencer 22 generates a set of waveform select signals 106 in response to a start strobe signal 100, the transmit_data signal 102, and the link_pulse signal 104. The waveform select signals 106 specify a sequence of predetermined waveform shapes for concatenation and transmission over the transmission line 200.

The waveform synthesis circuit 24 generates a set of waveform generation data 110 in response to the waveform select signals 106. The waveform generation data 110 provides digital sample data for a set of predetermined waveform pulses. The sample data enables the digital to analog conversion circuit 30 to construct an analog waveform that carries the information contained in the transmit_data signal 102.

The information contained in the transmit_data signal 102 in one embodiment is encoded Manchester data. According to the Manchester data coding, a low to high transition of the transmit_data signal 102 during a bit interval indicates a logical one and a high to low transition during a bit interval indicates a logical zero. The Manchester data contained in the transmit_data signal 102 causes the transmission system 200 to synthesize a sequence of waveform pulses each having one of two fundamental frequencies in accordance with the characteristics of Manchester encoded waveforms.

In one embodiment, the waveform synthesis circuit 24 includes a set of combinatorial logic that generates the waveform generation data 110. The multiplexor decode circuit 26 in such an embodiment isolates the combinatorial logic in the waveform synthesis circuit 24 from the high sample rate path to the dual DAC decoders 28 and the digital to analog conversion circuit 30. The multiplexor decode circuit 26 accepts multiple waveform data samples in parallel from the waveform synthesis circuit 24 and distributes the samples to the dual DAC decoders 28 under control of the multiplexor select signals 108.

The sequencer 22 is clocked by a master clock signal having a frequency in one embodiment of 100 MHz. The sequencer 22 updates the waveform select signals 106 every 20–30 nanoseconds. The waveform synthesis circuit 24 produces in one embodiment 30 bits of waveform generation data 110 every 20–30 nanoseconds. The 30 bits of waveform generation data 110 is arranged as 5 digital samples of waveform data having 6 bits in each sample. The most significant bit of each 6 bit sample provides a sign bit while the remaining 5 bits of each sample provide a magnitude of the corresponding sample.

The multiplexor decode circuit 26 routes the 5 parallel digital waveform samples in the waveform generation data 110 onto the dual paths, channel A and channel B, to the dual DAC decoders 28 in response to the multiplexor select signals 108. The sequencer 22 updates the multiplexor select signals 108 with the resolution of 10 nanoseconds. The multiplexor select signals 108 cause the multiplexor decode circuit 26 to sample the waveform generation data 110 and provide the dual streams of 6 bit samples to the dual DAC decoders 28 during each cycle of the 100 MHz master clock.

The dual DAC decoders 28 decode the channel A and channel B data streams every 10 nanoseconds. The dual DAC decoders 28 generate a resultant output stream to the digital to analog conversion circuit 30 wherein the output stream is clocked on both the rising and falling edges of the 100 MHz master clock. The digital to analog conversion circuit 30 converts each 6 bit digital sample into an analog signal which the driver circuit 32 transmits over the transmission line 200. The digital to analog conversion circuit 30 generates output samples on both the rising and the falling edges of the 100 MHz master clock which produces a 200 million samples per second output data rate for the driver circuit 32.

In another embodiment, the waveform synthesis circuit 24 is replaced by a waveform memory that stores digitally encoded data for the synthesized waveform pulses. The waveform memory serially transfers the digitally encoded data directly to the DAC decoders 28 at the full sample rate and the multiplexor decode circuit 26 is not present.

FIGS. 2a–2h illustrate the waveform pulses synthesized in the transmission system 20 in an embodiment wherein the transmit_data signal 102 is encoded as Manchester data. The synthesized waveform pulses each have one of two fundamental frequencies one of which is twice the frequency of the other in accordance with the characteristics of Manchester encoded waveforms. In this embodiment, the two fundamental waveform pulse frequencies are 5 MHz and 10 MHz.

Each of the shaded areas 200–203 illustrates a digitally encoded data sample for a 10 MHz synthesized pulse. The data samples that outline the shaded areas 200–203 have differing slopes near the zero-crossing level. The differing slopes are preselected to minimize zero-crossing discontinuities at zero-crossing for all possible transitions between 5 MHz and 10 MHz pulses.

The shaded areas 204 and 205 each illustrate the digitally encoded data samples for a beginning of a 5 MHz synthesized pulse. The shaded areas 206 and 207 each illustrate the digitally encoded data samples for an end of a 5 MHz synthesized pulse. In one embodiment, the composite 5 MHz synthesized pulses are predistorted to remove some of the energy because the transmission line 200 yields higher losses at such lower frequencies. The data samples that outline the shaded areas 204–207 have differing slopes near the zero-crossing level for all possible transitions between 5 MHz and 10 MHz pulses.

The transmission system 20 selects the waveform pulses 200–207 in response to the frequency transitions contained in the transmit_data signal 102. The sequencer 22 tracks the frequency history of the transmit_data signal 102 and controls the selection of waveform pulses 200–207 via the waveform select signals 106. The waveform pulses 200–207 represent data sample magnitudes. Each magnitudes sample is qualified by a corresponding sign bit that enables synthesis of both positive and negative versions of the waveform pulses 200–207.

The waveform select signals 106 cause the waveform synthesis circuit 24 to generate the 10 MHz waveform pulse 200 after a 10 MHz waveform pulse 210 and before a 10 MHz waveform pulse 211. The waveform select signals 106 cause the waveform synthesis circuit 24 to produce a 10 MHz waveform pulse 201 after a 10 MHz pulse 212 and before a 5 MHz waveform pulse 213. The 10 MHz waveform pulse 202 is selected after a 5 MHz waveform pulse 214 and before a 10 MHz waveform pulse 215. The 10 MHz waveform pulse 203 is selected after a 5 MHz waveform pulse 216 and before a 5 MHz waveform pulse 217.

The waveform select signals 106 select a beginning 204 of a 5 MHz waveform pulse after a 10 MHz waveform pulse 218 and before an end 219 of the 5 MHz waveform pulse. The waveform select signals 106 select a beginning 205 of a 5 MHz waveform pulse after a 5 MHz waveform pulse 220 and before an end 221 of the 5 MHz waveform pulse.

The waveform select signals 106 select an end 206 of a 5 MHz waveform pulse after a beginning 222 of the 5 MHz waveform pulse and before a 10 MHz waveform pulse 223. The waveform select signals 106 select an end 207 of a 5 MHz waveform pulse after a beginning 224 of the 5 MHz waveform pulse and before a 5 MHz waveform pulse 225.

In other embodiments, the leading and trailing zero-crossing edges of the waveform pulses 200–207 are adjusted in time to reduce waveform jitter on the transmission line 200. For example, the trailing edge of the waveform pulse 201 can be delayed to reduce the amount of frequency shift that occurs on the transmission line when transitioning from a 10 MHz waveform pulse 201 to a 5 MHz wave from pulse 213. In addition, the zero-crossing point of the leading edge of the waveform pulse 204 which follows the waveform pulse 201 is also adjusted to form a continuous zero-crossing and prevent the occurrences of discontinuities.

Figure 3B:
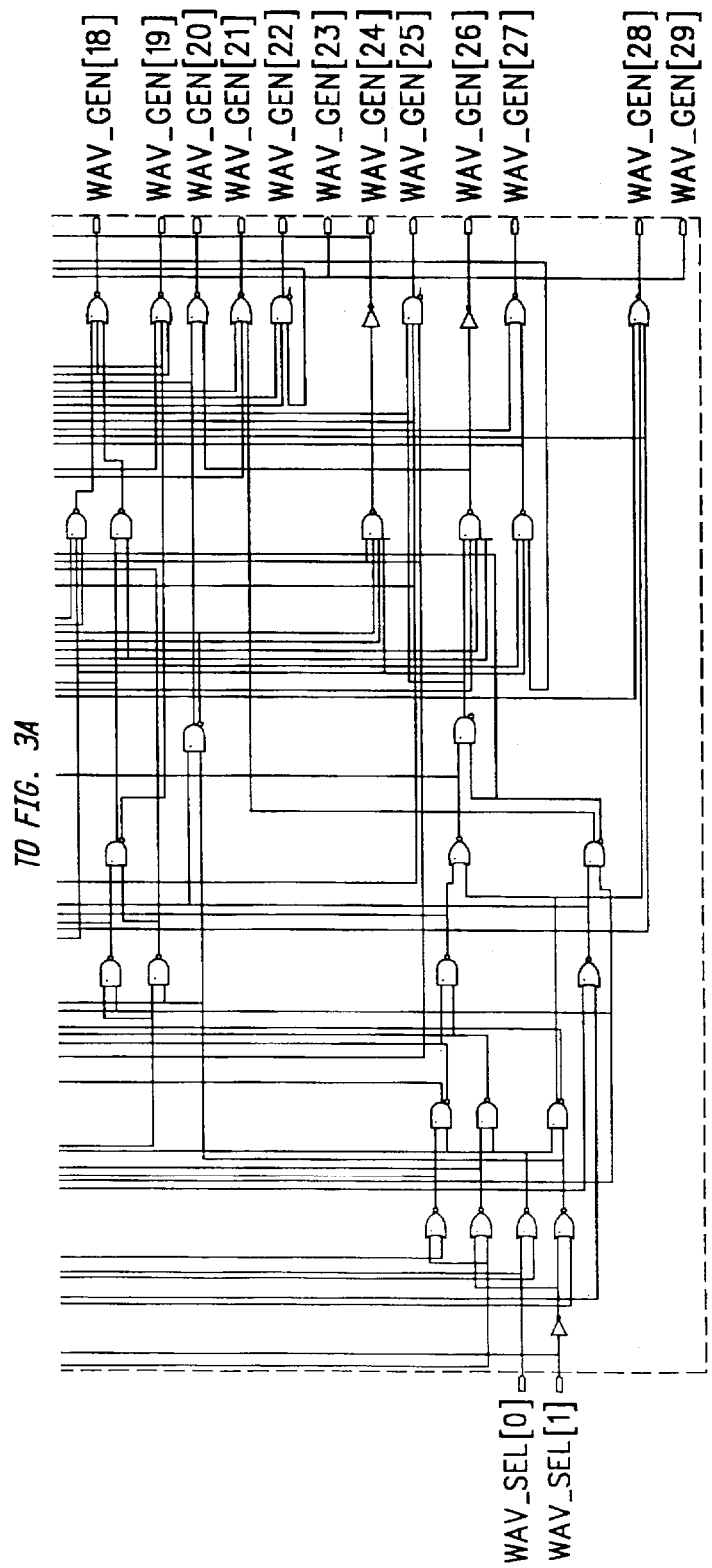
FIG. 3 illustrates the combinatorial logic in one embodiment of the waveform synthesis circuit which generates waveform data samples in response to the waveform select signals.

FIG. 3 illustrates the waveform synthesis circuit 24 in one embodiment. The combinatorial logic shown generates the waveform generation data 110 in response to the waveform select signals 106. The waveform generation data 110 comprises 30 bits of information which are referred to as WAV_GEN[0] through WAV_GEN[29]. The WAV_GEN [0] through WAV GEN[29] data provides 5 digital samples each of 6 bits. The waveform select signals 106 are shown as a WAV_SEL[0] through WAV_SEL[3] set of waveform select bits.

Figure 4:
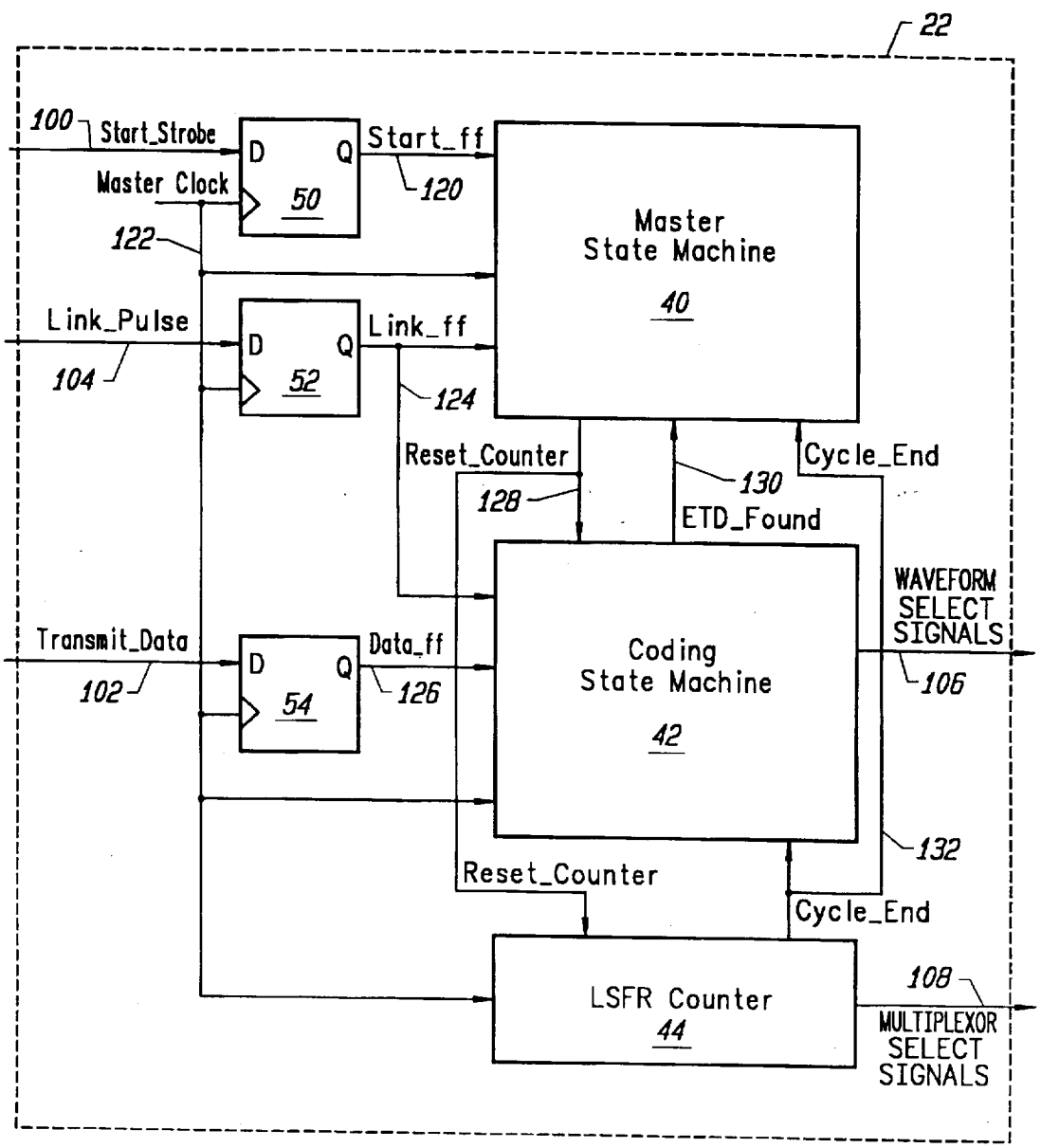
FIG. 4 illustrates a sequencer which includes a master state machine, a coding state machine, and a linear shift feedback register (LSFR) counter.

FIG. 4 illustrates the sequencer 22 in one embodiment which includes a master state machine 40, a coding state machine 42 and a counter 44 along with a set of flip-flops 50–54. The counter 44 is configured as a linear shift feedback register (LSFR) counter.

The flip-flops 50–54 sample the start_strobe signal 100, the link_pulse signal 104, and the transmit_data signal 102, respectively. The flip-flop 50 generates a start_FF signal 120 by synchronizing the start_strobe signal 100 to a master clock signal 122. The flip-flop 52 generates a link FF signal 124 by synchronizing the link_pulse signal 104 to the master clock signal 122. The flip-flop 54 generates a data_ FF signal 126 by synchronizing the transmit_data signal 102 to the master clock signal 122. In one embodiment, the master clock signal 122 has a frequency of 100 MHz which causes the flip-flops 50–54 to sample the start_strobe signal 100, the link_pulse 104 and the transmit_data signal 102 every 10 nanoseconds.

The master state machine 40 provides the highest level of control in the sequencer 22. The master state machine 40 determines the start, the middle and the end of a data communication packet and defines the occurrences of link_ pulses between data packets. In one embodiment, the master state machine 40 implements a set of 8 states M0 through M7 as shown below in Table 1.

TABLE 1

| State Codes | State Description |
| --- | --- |
| M0 | Idle State |
| M1 | First Manchester Code State |
| M2 | Normal Transmission State |
| M3 | End of Message 0 State |
| M4 | End of Message 1 State |
| M5 | End of Message 2 State |
| M6 | End of Message 3 State |
| M7 | End of Message 4 State |

Figure 5:
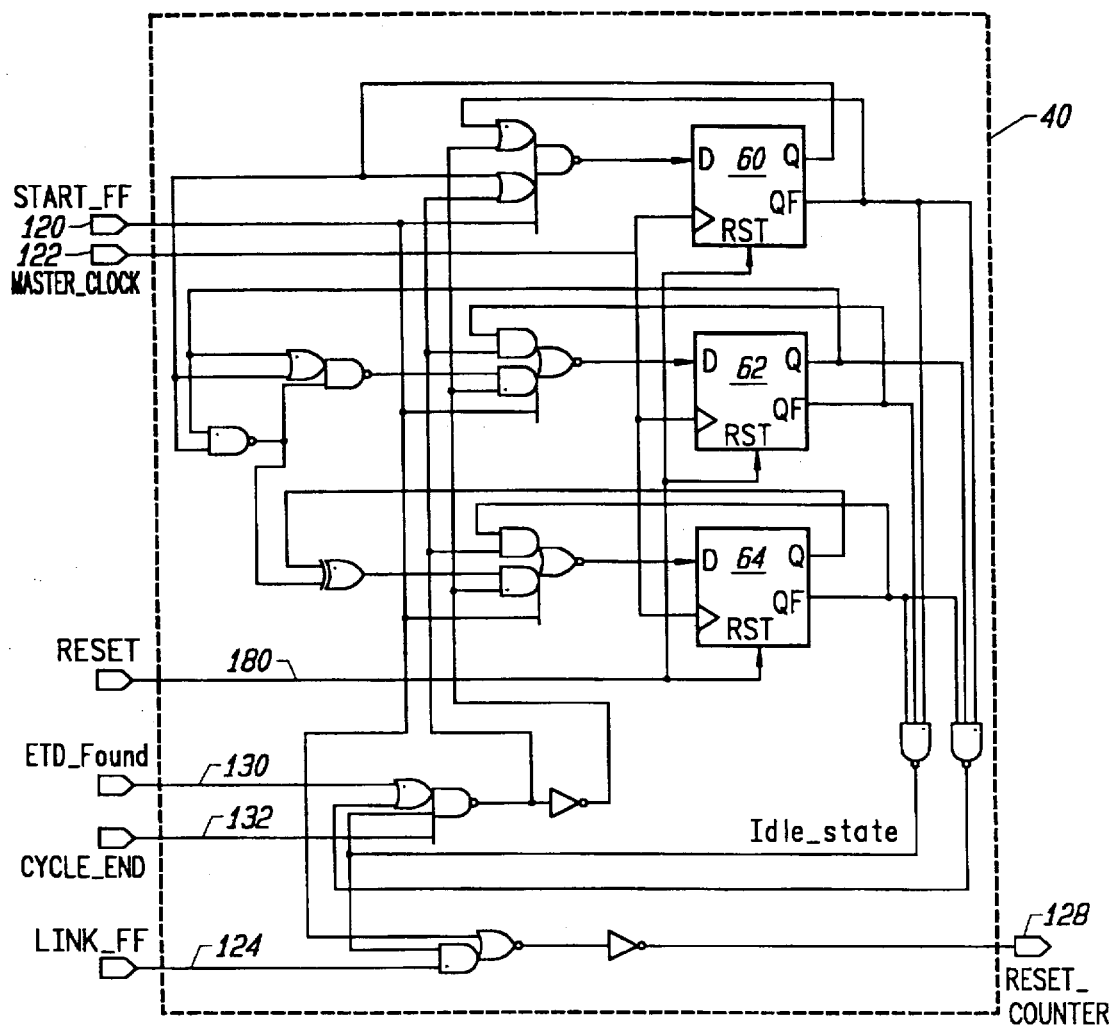
FIG. 5 illustrates the master state machine including a set of flip-flops that define a set of states M0 through M7.

FIG. 5 illustrates the master state machine 40 in one embodiment. The master state machine 40 includes a set of flip-flops 60–64 that define the states M0 through M7. A reset signal 180 which provides a master reset for the transmission system 20 resets each of the flip-flops 60–64 and causes the state machine 40 to enter the idle state M0.

A transition of the start_FF signal 120 causes the state machine 40 to transition from the idle state M0 to the first Manchester code state M1. A cycle_end signal 132 from the counter 44 will cause master state machine 40 to transition from the first Manchester code state M1 to the normal transmission state M2.

The master state machine 40 remains in the normal transmission state M2 until the coding state machine 42 asserts the ETD_found signal 130 which indicates an end of a transmission packet. Thereafter, the master state machine 40 transitions from state M3 through to state M7 and then back to the idle state M0. The master state machine 40 also generates a reset_counter signal 128 which resets the counter 44 and the coding state machine 42 at the start of the data communication packet.

The coding state machine 42 generates the waveform select signals 106 to select the appropriate synthesized waveform pulses from the waveform synthesis circuit 24. The coding state machine 42 implements a set of 16 states S0 through S15 which are defined below in Table 2.

TABLE 2

| State Codes | Sign | Pulse Description |
| --- | --- | --- |
| S0 | positive | 10 MHz Pulse, 10 MHz past, 10 MHz next |
| S1 | positive | 10 MHz Pulse, 10 MHz past, 5 MHz next |
| S2 | positive | 10 MHz Pulse, 5 MHz past, 10 MHz next |
| S3 | positive | 10 MHz Pulse, 5 MHz past, 5 MHz next |
| S4 | positive | 5 MHz beginning, 10 MHz past |
| S5 | positive | 5 MHz beginning, 5 MHz past |
| S6 | positive | 5 MHz ending, 10 MHz next |
| S7 | positive | 5 MHz ending, 5 MHz next |
| S8 | negative | 10 MHz Pulse, 10 MHz past, 10 MHz next |
| S9 | negative | 10 MHz Pulse, 10 MHz past, 5 MHz next |
| S10 | negative | 10 MHz Pulse, 5 MHz past, 10 MHz next |
| S11 | negative | 10 MHz Pulse, 5 MHz past, 5 MHz next |
| S12 | negative | 5 MHz beginning, 10 MHz past |
| S13 | negative | 5 MHz beginning, 10 MHz next |

TABLE 2-continued

| State Codes | Sign Pulse Description |
|---|---|
| S14 | negative 5 MHz ending, 10 MHz next |
| S15 | negative 5 MHz ending, 5 MHz next |

Figure 6:
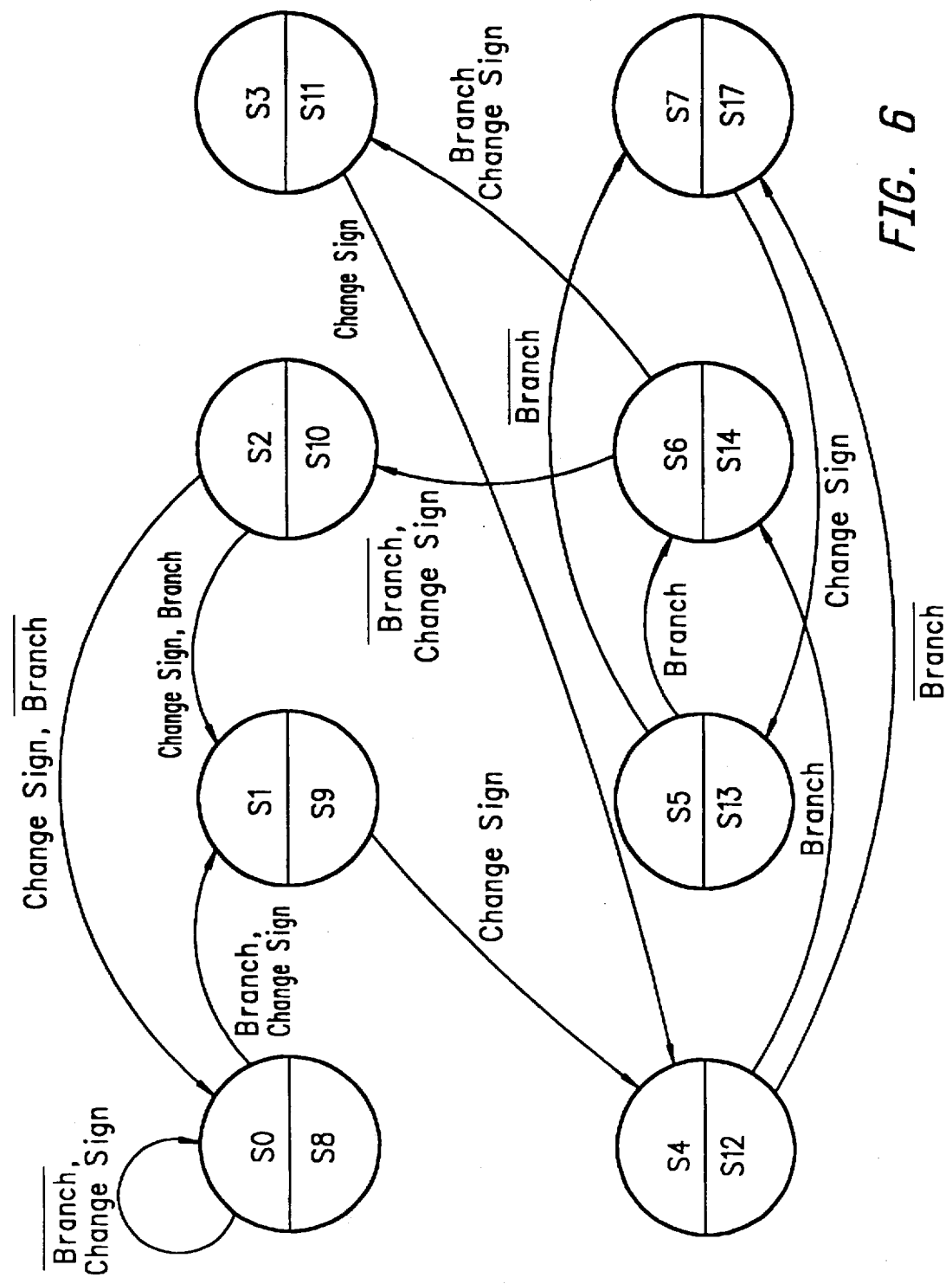
FIG. 6 shows a state diagram for the coding state machine which transitions among the states S0 through S15 to select a sequence of synthesized waveform pulses.

FIG. 6 shows a state diagram for the coding state machine 42. The coding state machine 42 transitions among the states S0 through S15 to select from among the waveform pulses 200–207. The state transitions shown are determined by logic level transitions in the Manchester data contained in the data_FF signal 126. The states S0 through S7 are the same as the coding state S8 through S15, respectively. The difference between the states S0 through S7 and S8 through S15 is a sign bit which indicated by the code state variable S3.

A single branch condition (BRANCH) determines a branch path for the coding state machine 42. The branch condition is determined by a XOR function of the data_FF signal 126 with the sign bit which is indicated by the code state S3. If at any given time a branch does not occur in the coding state machine 42 the coding state variable S3 may change to indicate a change in the sign of data samples.

Figure 7:
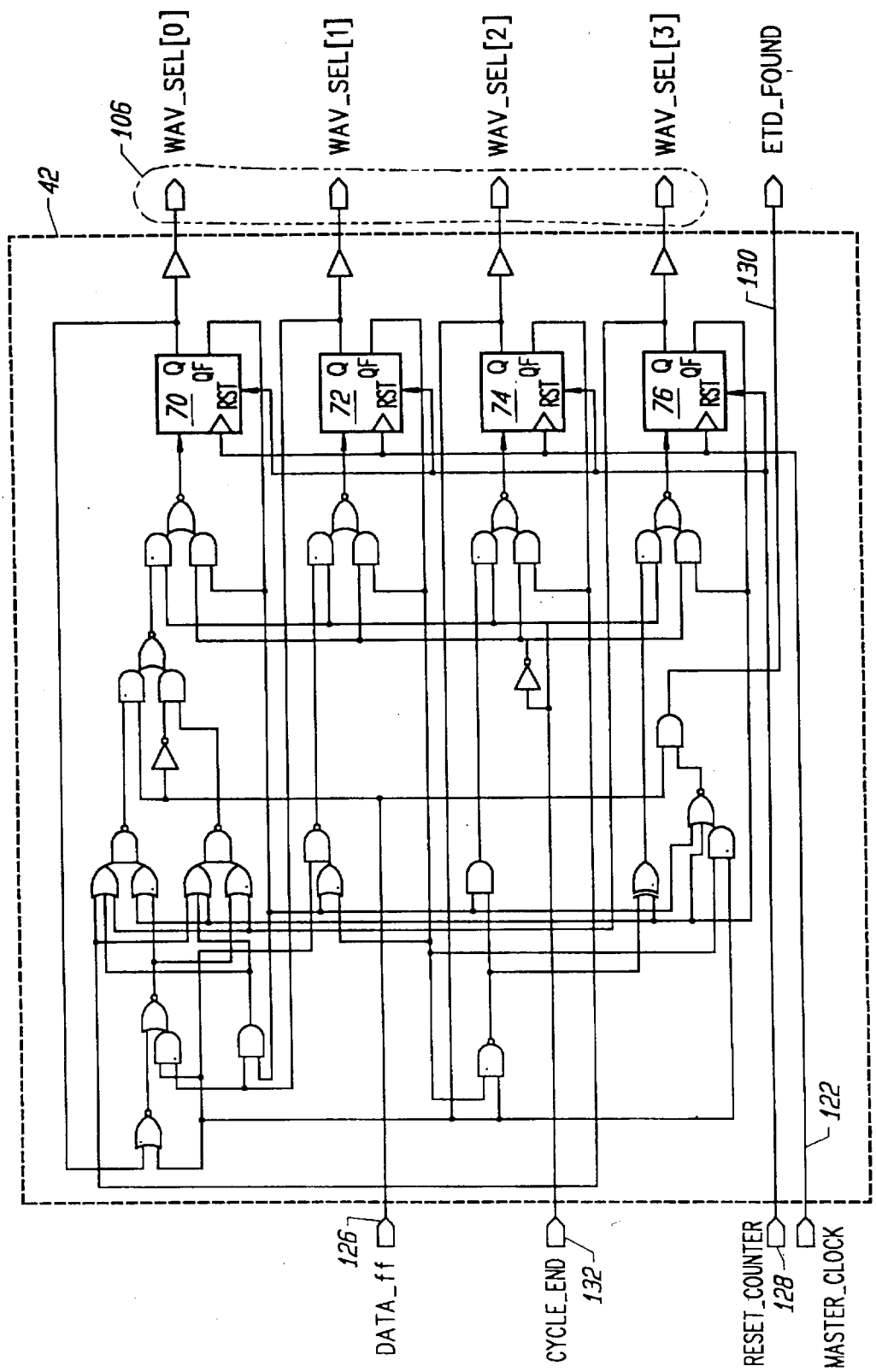
FIG. 7 illustrates the coding state machine including a set of flip-flops that implement the states S0 through S15 and provide the waveform select signals.

FIG. 7 illustrates the coding state machine 42 in one embodiment. The coding state machine 42 includes a set of flip-flops 70 through 76 that indicate the states S0 through S15. The Q outputs of the flip-flops 70–76 provide the waveform select signals 106 which are shown as a set of WAV_SEL[0]–WAV_SEL[3] bits.

The cycle_end signal 132 from the counter 44 qualifies the branch condition of the coding state machine 42. The coding state machine 42 does not change state if the cycle_end signal 132 is low. The reset counter signal 128 from the master state machine 40 clears the flip-flops 70–76 to an all 0 state. Thereafter, the data_FF signal 126 which is the Manchester input data controls the transitioning of the coding state machine 42 among the states S0–S15.

The WAV_SEL[0]–[3] bits switch state every 5 clock cycles of the master clock signal 122. The ETD_found signal 130 is generated by the coding state machine 42 to indicate that an illegal Manchester code of 3 consecutive ones is sampled from the data_FF signal 126. The ETD_found signal 130 is used by the master state machine 40 to detect the end of a packet transmission.

Figure 8:
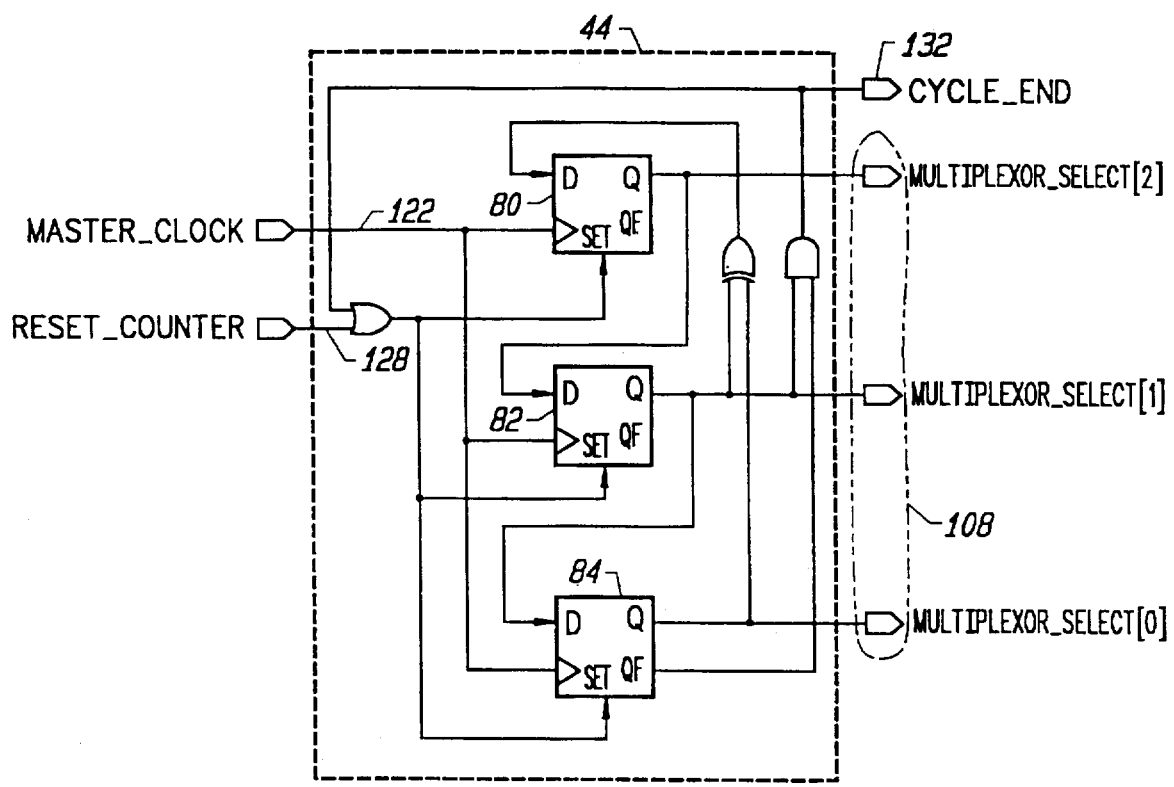
FIG. 8 illustrates the LSFR counter that provides a divide-by-5 function on the master clock signal.

FIG. 8 illustrates the LSFR counter 44 in one embodiment. The LSFR counter 44 is a 3-bit counter which includes a set of flip-flops 80–84. The LSFR counter 44 provides a divide-by-5 function on the master clock signal 122 and generates the multiplexor select signals 108. The multiplexor select signals 108 are shown as a set of multiplexor_select[0] through multiplexor_select[2] bits.

The reset_counter signal 128 is asserted by the master state machine 40 at the beginning of a packet transmission. The reset_counter signal 128 initially sets each of the flip-flops 80–84 to the logic one state. Thereafter, the LSFR counter 44 counts to 5 clock cycles of the master clock signal 122 and then resets back to the all ones state.

The LSFR counter 44 asserts the cycle_end signal 132 when the count value in the flip-flops 80–84 reaches 5, which indicates that the multiplexor decode circuit 26 should select another code from among the waveform generation data 110. The multiplexor_select[0] through multiplexor_select[2] are provided directly to the multiplexor decode circuit 26 to select digital samples from among the waveform data 110 for distribution over channels A and B to the digital to analog conversion circuit 30.

The LSFR counter 44 provides the divide-by-5 function using only the set of 3 flip-flops 80–84. Other types of divide circuits such as barrel shifters having 5 flip-flops may be employed in alternative embodiments. However, such circuitry takes up additional space on integrated circuit die that contains the sequencer 22.

Figure 9A:
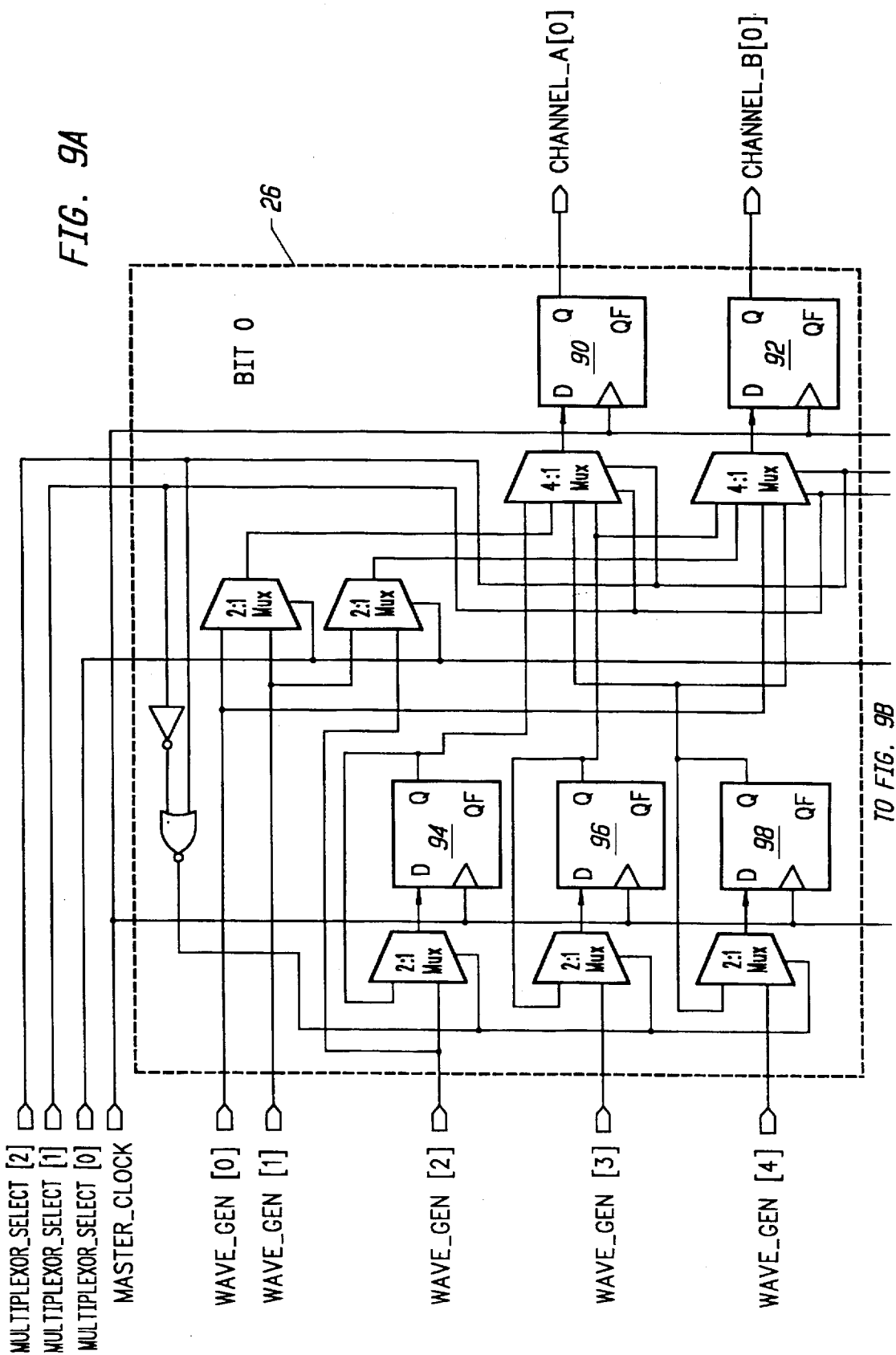
FIG. 9 illustrates the multiplexor decode circuit which in one embodiment.

FIG. 9 illustrates the multiplexor decode circuit 26 which is subdivided into a set of substantially similar circuits each corresponding to one a set of sample bits BIT0–BIT5 of a waveform data sample. For example, the channel A and channel B sample data for BIT0 of a waveform sample are supplied via the WAV GEN[0–4] bits.

The BIT0 circuitry in the multiplexor decode circuit 26 includes a pair of flip-flops 90 and 92 that are initially loaded with the WAV_GEN[0–1] bits from the waveform synthesis circuit 24. The outputs of the flip-flops 90–92 are provided immediately as BIT0 of channel A and channel B data to the dual DAC decoders 28. The WAV_GEN[2–4] bits are stored in a set of flip-flops 94–98. During subsequent cycles of the master clock signal 122, the stored waveform generation data in the flip-flops 94–98 are sequenced over the channel A and channel B paths to the dual DAC decoders 28.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A system for synthesizing a waveform, comprising:
   circuitry for generating digital data representative of each of a set of preselected waveform pulses wherein each preselected waveform pulse has a preselected slope at zero-crossing;
   circuitry for tracking a history of a data signal and wherein said circuitry for tracking is coupled to select from said circuitry for generating digital data a sequence of the preselected waveform pulses in response to the history such that the sequence conveys the history and such that mismatches between the preselected slopes of adjacent waveform pulses in the sequence are minimized; and
   circuitry coupled to receive the digital data for the sequence of the preselected waveform pulses and for converting the digital data for the sequence of the preselected waveform pulses into the waveform.

2. The system of claim 1, wherein the set of preselected waveform pulses comprises a first set of pulses having a first fundamental frequency and a second set of pulses having a second fundamental frequency wherein the first fundamental frequency is substantially twice the second fundamental frequency.

3. The system of claim 2, wherein the first set of pulses includes a pulse having a zero-crossing slope which is preselected to match a zero-crossing slope of a proceeding one of the second set of pulses in the sequence.

4. The system of claim 2, wherein the first set of pulses includes a pulse having a zero-crossing slope which is preselected to match a zero-crossing slope of a subsequent one of the second set of pulses in the sequence.

5. The system of claim 2, wherein the second set of pulses includes a pulse having a zero-crossing slope which is preselected to match a zero-crossing slope of a proceeding one of the first set of pulses in the sequence.

6. The system of claim 2, wherein the second set of pulses includes a pulse having a zero-crossing slope which is preselected to match a zero-crossing slope of a subsequent one of the first set of pulses in the sequence.

7. The system of claim 1, wherein said circuitry for generating is combinatorial circuitry.

8. The system of claim 1, wherein said set of preselected waveform pulses includes sixteen preselected waveform pulses.

9. A system for synthesizing a waveform, comprising:

combinatorial circuitry for generating digital data representative of each of a set of preselected waveform pulses, wherein said set of preselected waveform pulses includes a first set of waveform pulses having a first fundamental frequency and a second set of waveform pulses having a second fundamental frequency, and wherein each preselected waveform pulse has a preselected slope at zero-crossing;

circuitry, coupled to receive a data signal and coupled to said combinatorial circuitry, for tracking a history of said data-signal and for generating signals in response to said history to select a sequence of the preselected waveform pulses to be generated from said combinatorial circuitry such that the sequence conveys the history and such that mismatches between the preselected slopes of adjacent waveform pulses in the sequence are minimized;

digital to analog conversion circuitry coupled to receive the digital data for the sequence of the preselected waveform pulses and to convert the digital data for the sequence of the preselected waveform pulses into the waveform.

10. The system of claim 9, wherein:

the first set of pulses includes a first pulse having a zero-crossing slope which is preselected to match a zero-crossing slope of a proceeding one of the second set of pulses in the sequence, and a second pulse having a zero-crossing slope which is preselected to match a zero-crossing slope of a subsequent one of the second set of pulses in the sequence; and the second set of pulses includes a third pulse having a zero-crossing slope which is preselected to match a zero-crossing slope of a proceeding one of the second set of pulses in the sequence, and a fourth pulse having a zero-crossing slope which is preselected to match a zero-crossing slope of a subsequent one of the second set of pulses in the sequence.

11. The system of claim 9, wherein said set of preselected waveform pulses includes sixteen preselected waveform pulses.

12. The system of claim 11, wherein said circuitry for tracking includes combinatorial logic and four flip-flops.

13. A method for synthesizing a waveform, comprising the steps of:

generating digital data for each of a set of preselected waveform pulses wherein each preselected waveform pulse has a preselected slope at zero-crossing;

tracking a history of a data signal and selecting a sequence of the preselected waveform pulses in response to the history such that the sequence conveys the history and such that mismatches between the preselected slopes of adjacent waveform pulses in the sequence are minimized;

converting the digital data for the sequence of the preselected waveform pulses into the waveform.

14. The method of claim 13, further comprising the steps of:

selecting said set of preselected waveform pulses to include a first set of pulses having a first fundamental frequency and a second set of pulses having a second fundamental frequency, wherein the first set of pulses includes a first pulse having a zero-crossing slope which is preselected to match a zero-crossing slope of a proceeding one of the second set of pulses in the sequence, and a second pulse having a zero-crossing slope which is preselected to match a zero-crossing slope of a subsequent one of the second set of pulses in the sequence, and wherein the second set of pulses includes a third pulse having a zero-crossing slope which is preselected to match a zero-crossing slope of a proceeding one of the second set of pulses in the sequence, and a fourth pulse having a zero-crossing slope which is preselected to match a zero-crossing slope of a subsequent one of the second set of pulses in the sequence.

* * * * *